(12) United States Patent
Tin

(10) Patent No.: US 8,908,964 B2
(45) Date of Patent: Dec. 9, 2014

(54) COLOR CORRECTION FOR DIGITAL IMAGES

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 568 days.

(21) Appl. No.: 13/236,025

(22) Filed: Sep. 19, 2011

(65) Prior Publication Data

US 2012/0070082 A1 Mar. 22, 2012

Related U.S. Application Data

(63) Continuation-in-part of application No. 12/886,433, filed on Sep. 20, 2010, now abandoned.

(51) Int. Cl.
*G06K 9/00* (2006.01)
*H04N 1/60* (2006.01)

(52) U.S. Cl.
CPC ..................................... *H04N 1/60* (2013.01)
USPC ............ 382/167; 382/154; 382/190; 345/680

(58) Field of Classification Search
USPC ............................ 382/154, 167, 190; 345/680
See application file for complete search history.

(56) References Cited

U.S. PATENT DOCUMENTS

| 7,607,141 B2 * | 10/2009 | Foehr et al. ................... 719/322 |
| 7,724,253 B1 | 5/2010 | Cook et al. ..................... 345/422 |
| 2004/0109004 A1 | 6/2004 | Bastos et al. .................. 345/587 |
| 2005/0244065 A1 | 11/2005 | Malvar et al. ................. 382/239 |
| 2008/0056533 A1 | 3/2008 | Cooper .......................... 382/103 |
| 2009/0213240 A1 * | 8/2009 | Sim et al. .................... 348/222.1 |
| 2010/0002948 A1 | 1/2010 | Gangwal et al. .............. 382/254 |
| 2010/0080448 A1 * | 4/2010 | Tam et al. ..................... 382/154 |

FOREIGN PATENT DOCUMENTS

JP 2008052428 * 3/2008 ................ G06T 1/00

OTHER PUBLICATIONS

Kanematsu, "Image processing method, image processor, image processing program and imaging device"; Mar. 6, 2008; JP 2008052428 english translation.*
International Search Report and Written Opinion dated Feb. 6, 2012 in counterpart PCT/US2011/052296.

* cited by examiner

*Primary Examiner* — Chan Park
*Assistant Examiner* — Eueng-Nan Yeh
(74) *Attorney, Agent, or Firm* — Fitzpatrick, Cella, Harper & Scinto

(57) ABSTRACT

Colors in a color image are transformed by a destination device. The color image comprises pixels with color information. A depth map corresponding to the color image is accessed. The depth map comprises depth information for the color image and indicates the relative position of objects in the color image from a reference point of view. A collection of plural different color transforms is accessed. In addition, a depth value for a target pixel in the color image is determined by using the depth map. There is a selection of a color transform for the target pixel from the collection of plural different color transforms, based on the depth value determined for the target pixel. The selected color transform is applied to the color information of the target pixel by the destination device.

38 Claims, 12 Drawing Sheets

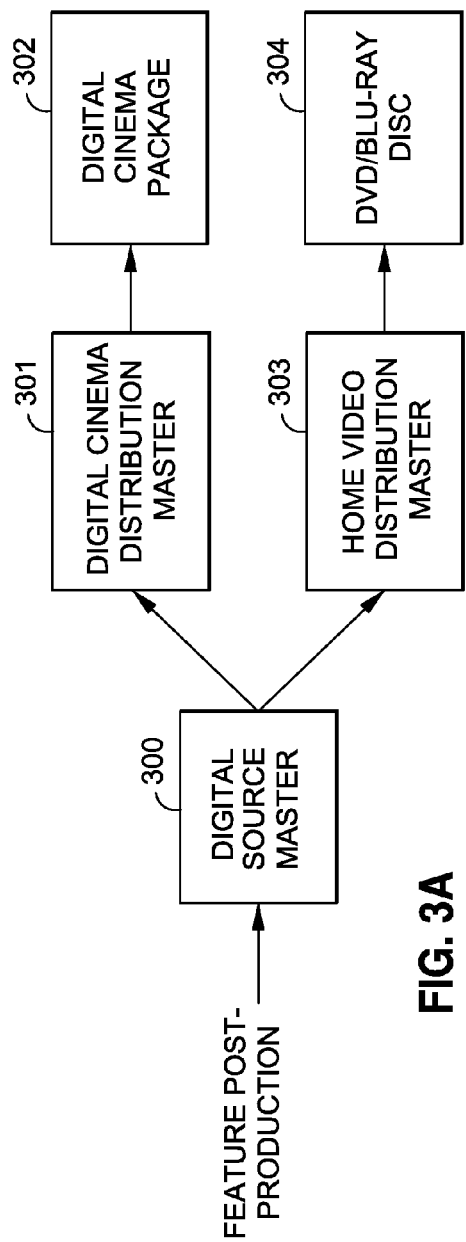
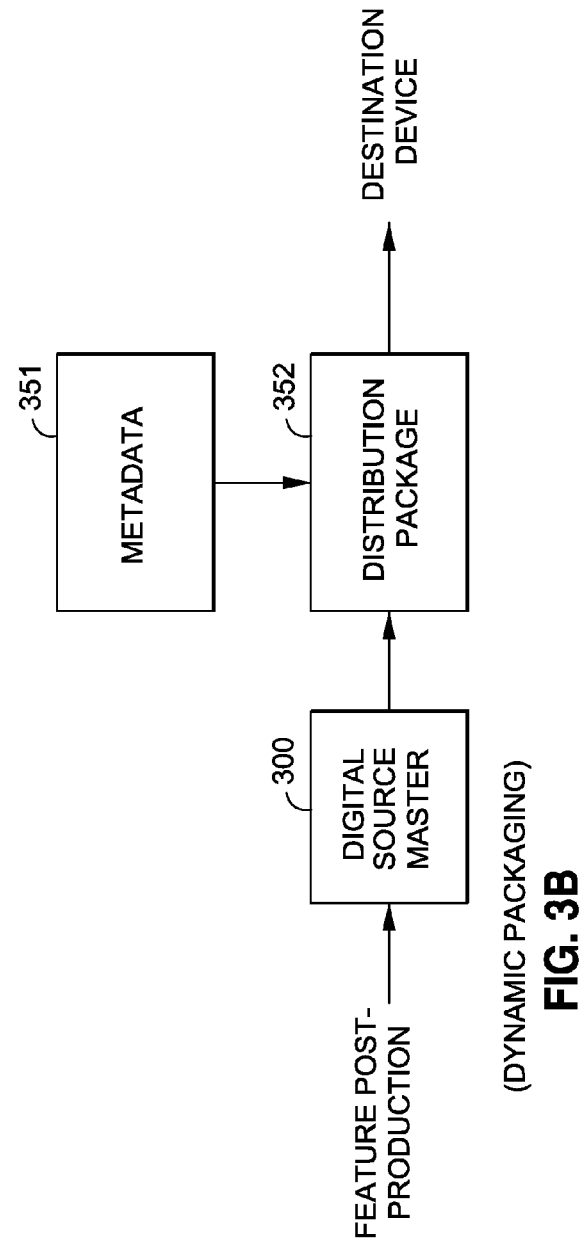
FIG. 3A *(PRIOR ART)*
FIG. 3B (DYNAMIC PACKAGING)

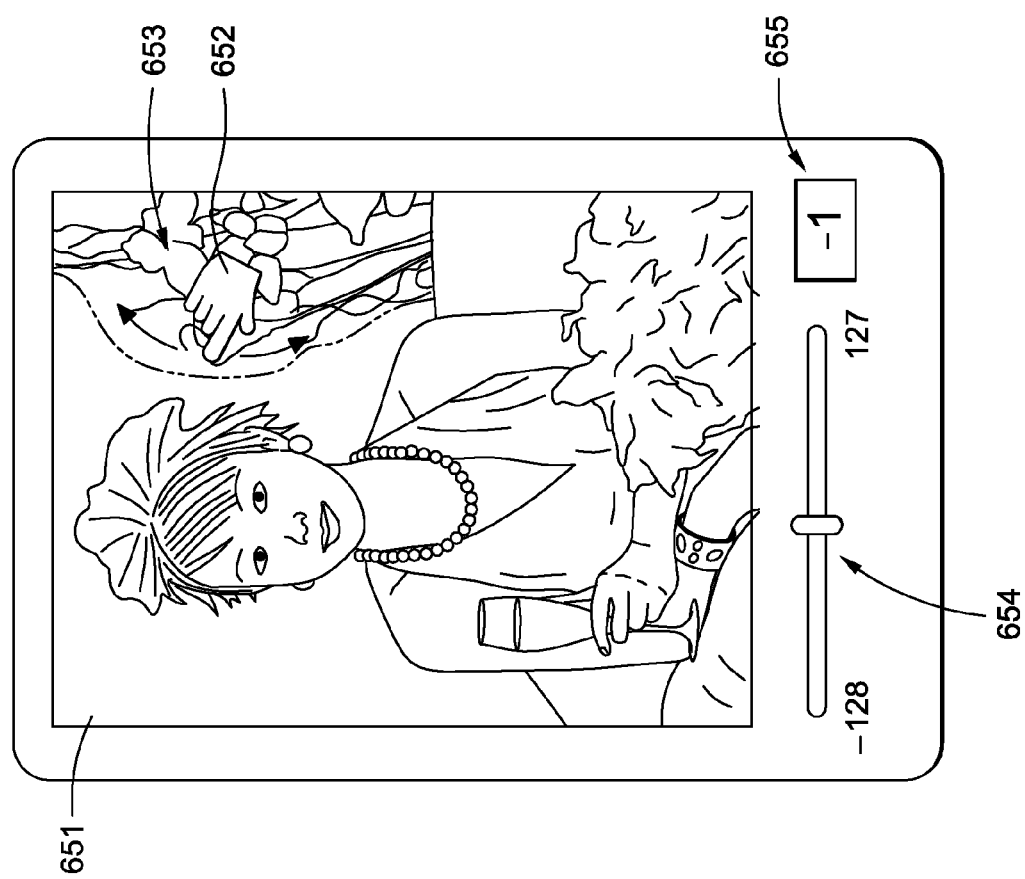

US 8,908,964 B2

COLOR CORRECTION FOR DIGITAL IMAGES

CROSS-REFERENCE TO RELATED APPLICATION

This application is a continuation-in-part of U.S. patent application Ser. No. 12/886,433, filed Sep. 20, 2010, and claims the benefit of such application, the contents of which are hereby incorporated by reference as if fully stated herein.

FIELD

The present disclosure relates to color correction for digital images, and more particularly relates to color correction for digital images for multiple types of destination devices.

BACKGROUND

In the field of digital images, it is common to perform color correction targeted to a particular type of destination device or medium. For example, color correction in digital cinema, more typically known as color grading, is performed on images from original footage to produce a digital source master which will then be packaged in a distribution master specifically for exhibition in theaters.

In one typical example, a separate color grading session is performed by a colorist for each distribution channel. This is necessary due to the vast difference in viewing conditions of different media. For example, the screen size and effect of stray light in a theater is vastly different from that in a home theater. For this reason, two different distribution masters are ordinarily created. A digital cinema distribution master is created for exhibition in theaters, whereas a home video distribution master is created for home video distribution.

SUMMARY

One problem with known color correction techniques is the need to remaster for each different distribution channel. This problem is exacerbated by a rapidly increasing variety of destination devices and viewing platforms, such as portable computers, portable media players, mobile phones, or game consoles. While remastering can be reduced by simply using the same master for different destinations, quality is reduced as the one master is not tailored to different destination devices.

One possible solution at minimizing the number of distribution masters is to delegate color correction to the destination device. In other words, the same master would be rendered differently by different destination devices such that the rendering of colors is optimized for each particular destination device. However, such an approach is limited by the fact that different destination devices have vastly different computational capability. For example, the processing power of a processor in a mobile phone is significantly lower than that of a processor in a PC. If the complexity of the color correction transform exceeds the computational capabilities of the device, performance can be significantly reduced, such as dropping frames during movie playback.

Moreover, one color transform may not even be best for every part of the image. For example, different color correction may be needed for regions within the depth of field and outside the depth of field. In addition, color transforms of varying computational complexity may be used for different regions of the image.

The foregoing situations are addressed by selecting a color transform for a pixel of a color image from a set of plural different color transforms appropriate for a destination device, based on depth information corresponding to the color image. For example, the pixels within the depth of field can be determined from the depth information and the camera metadata stored in the EXIF data.

Thus, in an example embodiment described herein, colors in a color image are transformed by a destination device. The color image comprises pixels with color information. A depth map corresponding to the color image is accessed. The depth map comprises depth information for the color image and indicates the relative position of objects in the color image from a reference point of view. A collection of plural different color transforms is accessed. In addition, a depth value for a target pixel in the color image is determined by using the depth map. There is a selection of a color transform for the target pixel from the collection of plural different color transforms, based on the depth value determined for the target pixel. The selected color transform is applied to the color information of the target pixel by the destination device.

By selecting a color transform for a pixel from plural different color transforms, based on depth information indicating the relative position of objects in the color image from a reference point of view, it is ordinarily possible to select a color transform particularly well suited to the computational capabilities of the destination device, as well as to the specific region of the image to which the target pixel belongs.

In another example embodiment, a sequence of plural color images is distributed for rendering by multiple different destination devices. Each color image comprises pixels with color information. There is a predesignated collection of plural different color transforms, and there is an association of each color image with a depth map. The depth map comprises depth information for the color image and indicates the relative position of objects in the color image from a reference point of view. Each destination device is associated with a correspondence table constructed to store a mapping between the depth information and plural different color transforms in the collection. At the destination device, a color transform is selected for each target pixel in each color image by determining a depth value for the target pixel using the depth map, determining an index into the correspondence table associated with the destination device using the depth value so determined, selecting a color transform corresponding to the determined index, and applying the selected color transform to the target pixel.

By selecting a color transform for a pixel from plural different color transforms appropriate for a destination device, based on the depth information indicating the relative position of objects in the color image from a reference point of view, there is ordinarily no need to create a different master for each destination distribution channel.

This brief summary has been provided so that the nature of this disclosure may be understood quickly. A more complete understanding can be obtained by reference to the following detailed description and to the attached drawings.

BRIEF DESCRIPTION OF THE DRAWINGS

FIGS. 3A and 3B are views for explaining image distribution.

FIGS. 6A and 6B are views for explaining selection of color transforms for pixels and user input for a depth map according to example embodiments.

DETAILED DESCRIPTION

Figure 1:
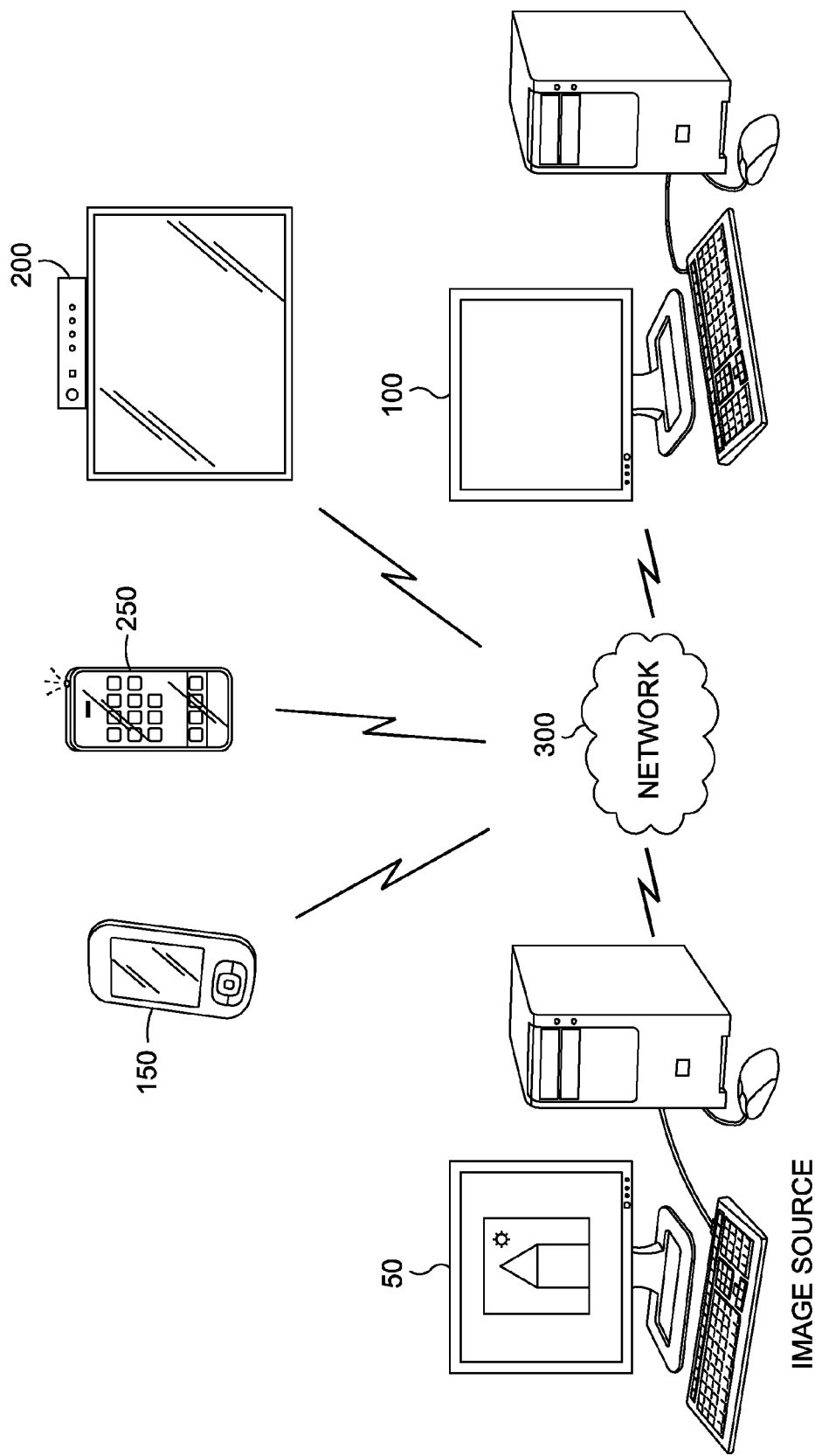
FIG. 1 illustrates an example environment in which aspects of the present disclosure may be practiced.

FIG. 1 illustrates an example environment in which aspects of the present disclosure may be practiced.

As shown in FIG. 1, computer 50 acts as an image source server. Computer 50 distributes a source color images across network 300 to destination devices, for rendering at the destination devices. Computer 50 is connected to computer 100, PDA 150, set-top box 200 and mobile phone 250 via network 300. Each of computer 100, PDA 150, set-top box 200 and mobile phone 250 may have different requirements for transforming colors in a color image, and typically have non-standardized capability regarding rendering of colors and computing power.

Computer 100 generally comprises a programmable general purpose personal computer having an operating system, such as Microsoft® Windows® or Apple® Mac OS® or LINUX, and which is programmed as described below so as to perform particular functions and, in effect, become a special purpose computer when performing these functions.

Computer 100 includes computer-readable memory media, such as fixed disk 45 (shown in FIG. 2), which is constructed to store computer-readable information, such as computer-executable process steps or a computer-executable program for causing computer 100 to perform a method for transforming colors in a color image, as described more fully below.

While FIG. 1 depicts a computer 50 as an image source server and a computer 100 as a one example of a destination device, computing equipment for practicing aspects of the present disclosure can be implemented in a variety of embodiments.

PDA 150 is a mobile device which functions as a personal information manager, and which can receive a color image from image source server 50 over network 300. PDA 150 may have limited color transform capabilities as compared with other destination devices, such as computer 100. Specifically, performing overly complex transforms at PDA 150 may lead to significant reduction in performance, such as dropping frames during movie playback.

Set-top box 200 is another example of a device which may connect to network 300 and receive color images from image source server 50. In particular, set-top box 200 is a device that connects to an external source of signal, turning the signal into content which is then displayed on a television screen or other display device. The processing capabilities of set-top box 200 may vary widely according to, for example, the variety of content set-top box 200 is designed to process.

Mobile phone 250 is still another example of a device which may connect to network 300 and receive color images from image source server 50. Generally, as with PDA 150, mobile phone 250 may have limited color transform capabilities as compared with other destination devices. In that regard, different types of mobile phones may vary widely in processing power.

For purposes of conciseness, only computer 100, PDA 150, set-top box 200 and mobile phone 250 are shown as destination devices in FIG. 1, but of course, any number and type of other destination devices with varying capabilities and processing power may be used, including ultra-mobile computers, netbooks, portable media players or game consoles, among many others.

Network 300 transmits data between computer 100, PDA 150, set-top box 200 and mobile phone 250. The implementation, scale and hardware of network 300 may vary according to different embodiments. Thus, for example, network 300 could be the Internet, a Local Area Network (LAN), Wide Area Network (WAN), Metropolitan Area Network (MAN), or Personal Area Network (PAN), among others. Network 300 can be wired or wireless, and can be implemented, for example, as an Optical fiber, Ethernet, or Wireless LAN network. In addition, the network topology of network 300 may vary.

Figure 2:
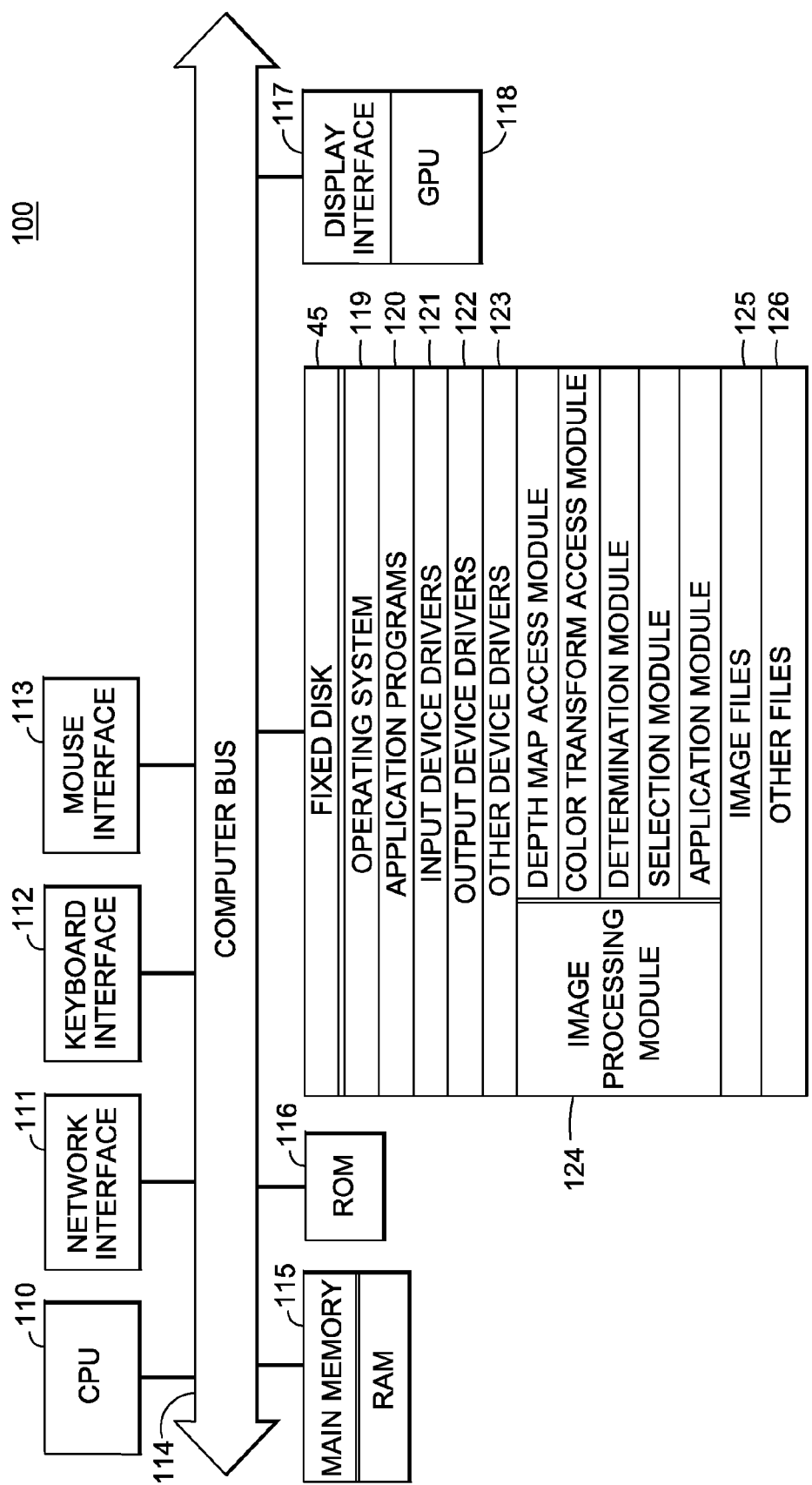
FIG. 2 is a detailed block diagram depicting an example of the internal architecture of the computer shown in FIG. 1 according to an example embodiment.

FIG. 2 is a detailed block diagram depicting an example of the internal architecture of the computer shown in FIG. 1 according to an example embodiment. For purposes of conciseness, only the internal architecture of computer 100 is described below, but it should be understood that other destination devices such as computer 100, PDA 150, set-top box 200 and mobile phone 250 may include similar components, albeit perhaps with differing capabilities.

As shown in FIG. 2, computer 100 includes central processing unit (CPU) 110 which interfaces with computer bus 114. Also interfacing with computer bus 114 are fixed disk 45 (e.g., a hard disk or other nonvolatile storage medium), network interface 111 for accessing other devices across network 300 including image source server 50, keyboard interface 112, mouse interface 113, random access memory (RAM) 115 for use as a main run-time transient memory, read only memory (ROM) 116, and display interface 117 for a display screen or other output.

GPU 118 is a programmable graphics processing unit, which is a parallel-processing device that is ordinarily designed to render computer graphics, and which can also be programmed to perform calculations for non-graphics data traditionally handled by a CPU. GPU 118 may have a SIMD architecture. SIMD, short for single instruction-multiple data stream, is a type of parallel computing architecture that allows a single computer instruction to perform an identical action simultaneously on multiple pieces of data using multiple processing units.

RAM 115 interfaces with computer bus 114 so as to provide information stored in RAM 115 to CPU 110 during execution of the instructions in software programs, such as an operating system, application programs, image processing modules, and device drivers. More specifically, CPU 110 first loads computer-executable process steps from fixed disk 45, or another storage device into a region of RAM 115. CPU 110 can then execute the stored process steps from RAM 115 in order to execute the loaded computer-executable process steps. Data, such as color image data received on network 300, or other information, can be stored in RAM 115 so that the data can be accessed by CPU 110 during the execution of the computer-executable software programs, to the extent that such software programs have a need to access and/or modify the data.

As also shown in FIG. 2, fixed disk 45 contains computer-executable process steps for operating system 119, and application programs 120, such as image management or display programs. Fixed disk 45 also contains computer-executable process steps for device drivers for software interface to devices, such as input device drivers 121, output device drivers 122, and other device drivers 123. Image files 125 may include color images received from image source server 50 which require color transform, or transformed images waiting to be displayed. Other files 126 are available for output to output devices and for manipulation by application programs.

Image processing module 124 comprises computer-executable process steps for transforming colors in a color image, and generally comprises a depth map access module, a color transform access module, a determination module, a selection module, and an application module. More specifically, image processing module 124 is configured to select a color transform for a pixel of a color image from a set of plural different color transforms appropriate for the destination device (e.g., computer 100 in this example), based on depth information corresponding to the color image. This process will be described in more detail below.

The computer-executable process steps for image processing module 124 may be configured as part of operating system 119, as part of an output device driver, such as a display driver, or as a stand-alone application program. Image processing module 124 may also be configured as a plug-in or dynamic link library (DLL) to the operating system, device driver or application program. It can be appreciated that the present disclosure is not limited to these embodiments and that the disclosed modules may be used in other environments.

FIGS. 3A and 3B are views for explaining image distribution.

In one conventional approach shown in FIG. 3A, all color correction is performed manually by a highly specialized colorist. Thus, for example, the colorist color-corrects digital source master 300 during the creation of a digital cinema distribution master 301, which is used to create a digital cinema package 302 for distribution to movie theaters. The colorist also separately color-corrects the same digital source master 300 during the creation of a different home video distribution master 303, for distribution to home devices such as a DVD/BLU-Ray disc 304. Accordingly, the specialized colorist remasters digital source master 300 for each distribution channel, requiring significant effort and time. While such remastering can be reduced by simply using the same master for different destinations, quality is reduced as the one master is not tailored to different destinations.

Accordingly, in another approach seen in FIG. 3B, the digital source master 300 is packaged into a distribution package 352 as "essence", without platform dependent modifications, such as color grading, permanently applied. Instead, platform dependent modifications are described separately by platform dependent metadata 351. Platform dependent metadata 351 can be included in the distribution package 352 or transmitted separately from image source server 50. The essence and metadata together can be used by the destination device to render content on the fly.

In this way, instead of creating a special distribution master for each destination device, digital source master 300 can be packaged independently of metadata 351 that may be specific for a particular destination device. The metadata 351 contains instructions on how to render the image data in digital source master 300 to the destination device. Specifically, the metadata 351 may pertain to information and instructions for color rendering at the particular destination device. Because the color correction is described by external metadata 351 and not "baked in" to the content itself as in the conventional method, it is possible to perform the color correction dynamically at the destination device, and more quickly than individual correction by a colorist.

Nevertheless, as mentioned above, not all destination devices have the same computational capabilities. In particular, certain devices with limited capabilities may suffer significant reduction in performance if the complexity of the color transform exceeds the capabilities of the device. In addition, color transforms of varying computational complexity may be necessary for different regions of the image.

Therefore, selecting a color transform for a pixel from a set of transforms appropriate for a destination device based on depth information corresponding to the color image will now be described with respect to FIGS. 4 to 7.

FIGS. 4A to 4D illustrate the image processing module of FIG. 2 according to example embodiments.

In particular, FIGS. 4A to 4D illustrate examples of image processing module 124 in which the sub-modules of image processing module 124 are included in fixed disk 45. Each of the sub-modules are computer-executable software code or process steps executable by a processor, such as CPU 110, and are stored on a computer-readable storage medium, such as fixed disk 45 or RAM 115. More or fewer modules may be used, and other architectures are possible.

Figure 4A:
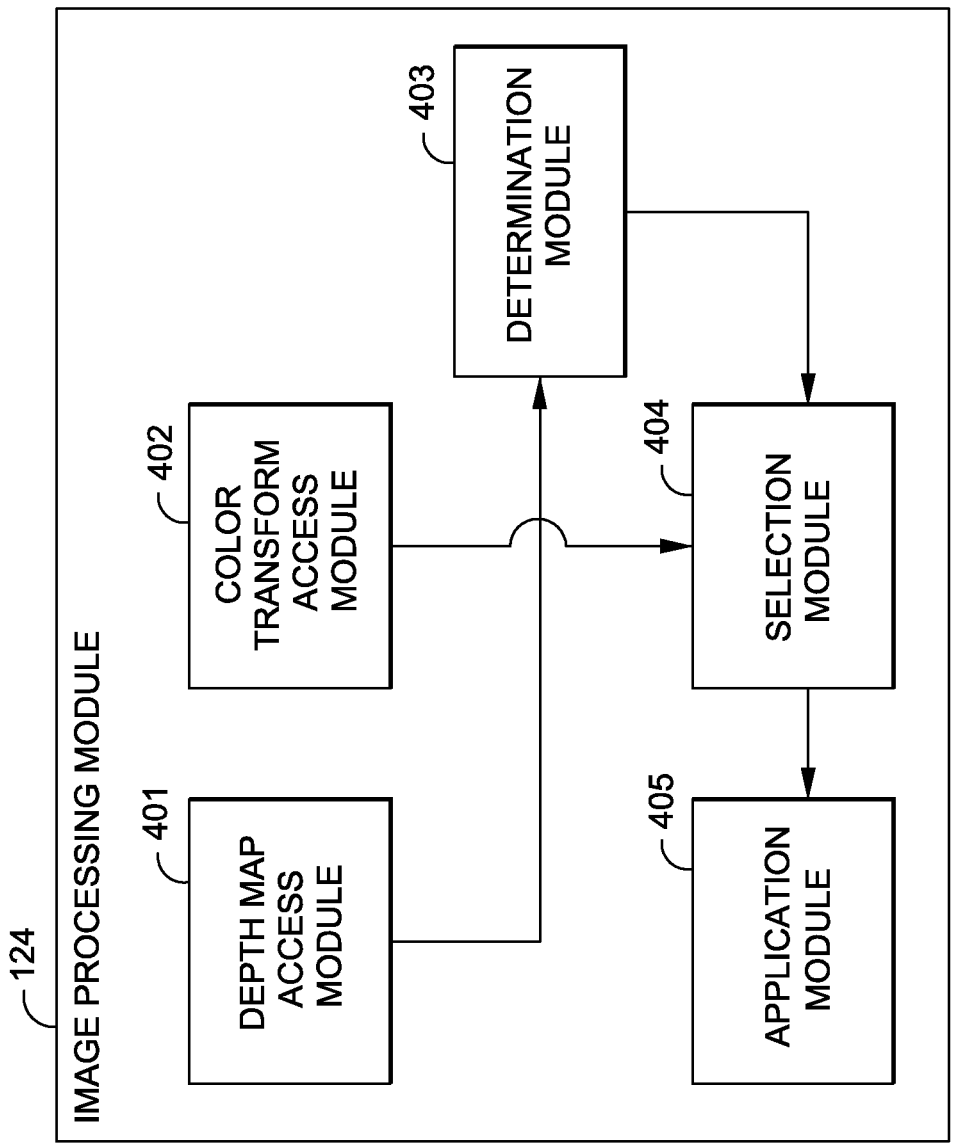
FIGS. 4A to 4D illustrate image processing modules according to example embodiments.

As shown in FIG. 4A, image processing module 124 includes depth map access module 401 for accessing a depth map corresponding to the color image. The depth map comprises depth information for the color image and indicates the relative position of objects in the color image from a reference point of view. Image processing module 124 further includes color transform access module 402 for accessing a collection of plural different color transforms. Determination module 403 determines a depth value for a target pixel in the color image by using the depth map. Additionally, image processing module 124 includes selection module 404 for selecting a color transform for the target pixel from the collection of plural different color transforms. The color transform is selected based on the depth value determined for the target pixel. Image processing module 124 also includes application module 405 for applying the selected color transform to the color information of the target pixel.

Figure 4B:
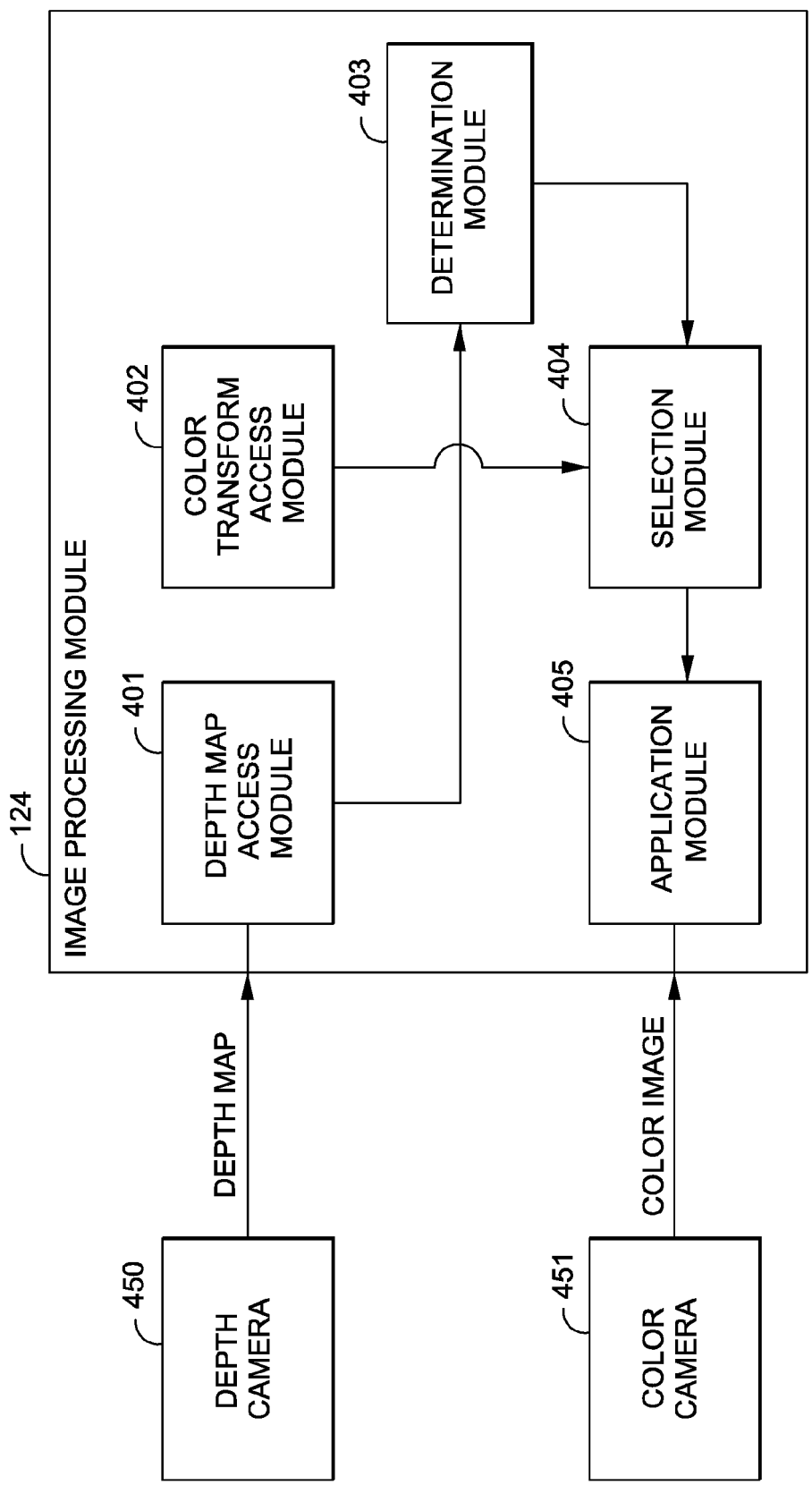

FIG. 4B depicts an example relationship of image processing module 124 with other components of the system. In particular, FIG. 4B depicts an example embodiment in which depth map access module 401 is connected to a depth camera 450, and application module 405 is connected to a color camera 451.

Figure 4C:
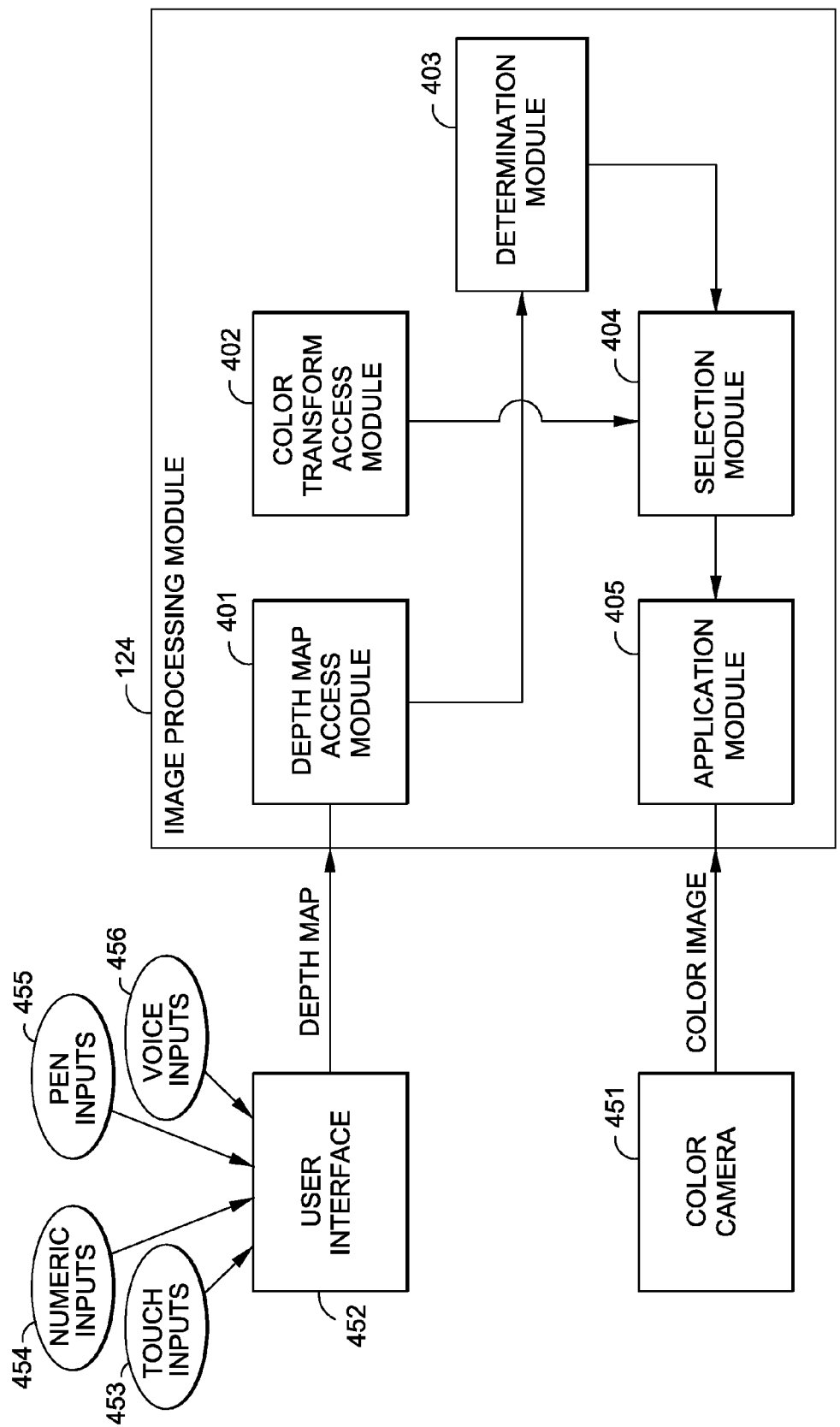

In another example embodiment, a depth map access module is connected to a user interface system, which a user can manipulate either manually or semi-automatically to generate a depth map dynamically. FIG. 4C shows the relationship of image processing module with other components of the system in this example embodiment.

In particular, as shown in FIG. 4C, user interface 452 may accept, for example, touch inputs 453, numeric inputs 454, pen inputs 455 or voice inputs 456. Of course, other types of inputs are possible. Using user interface 452, a user may generate a desired depth map. In particular, in one instance of the above embodiment, the user manually designates regions of the color image and assigns a depth value to each region. Meanwhile, color camera 451 provides a color image to application module 405. Thus, in this example, the accessed depth map is based on user input corresponding to a user interface, as discussed more fully below with respect to FIG. 5B.

Figure 4D:
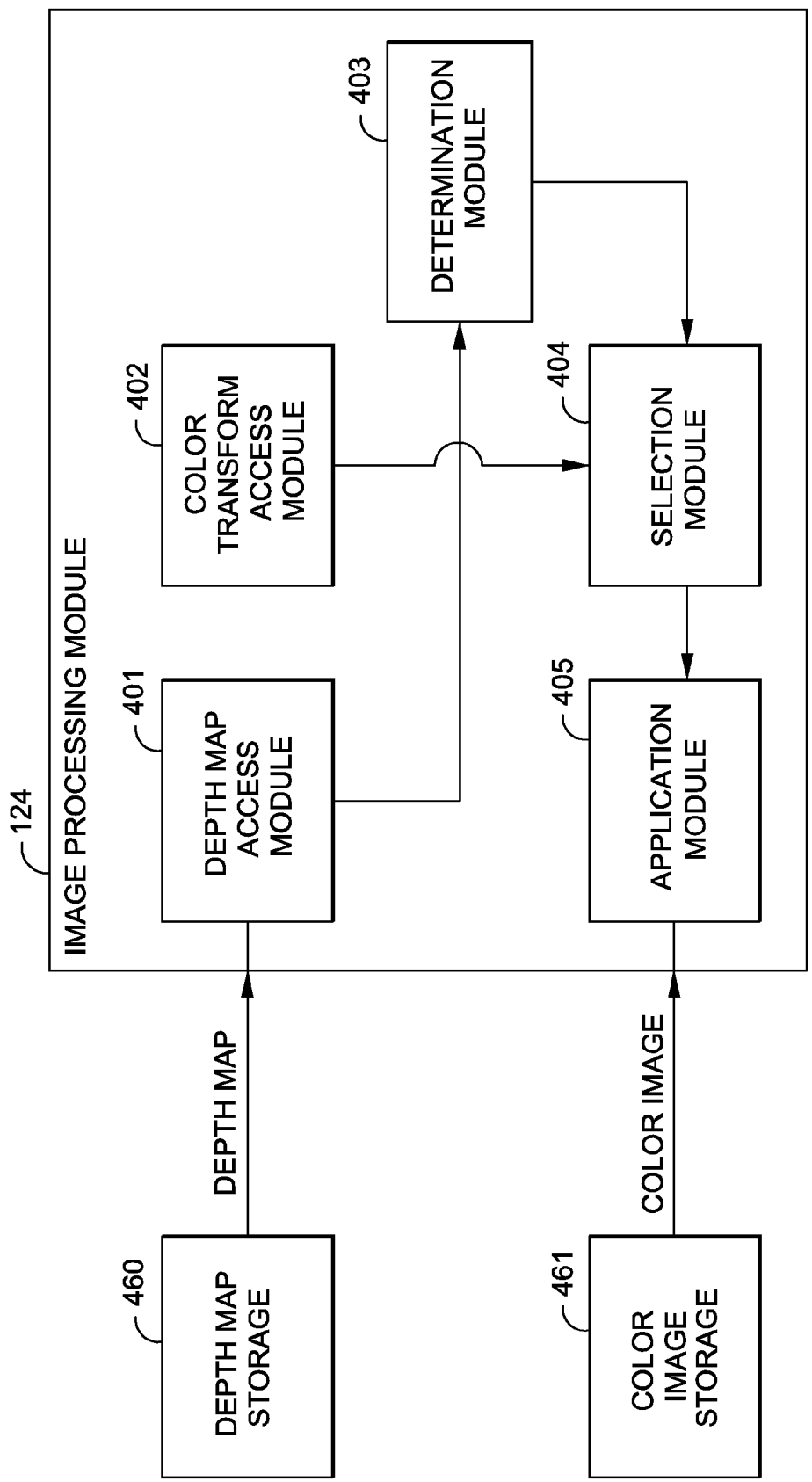

In still another example embodiment, the depth map access module is connected to a storage system where the color images and depth images are stored, as shown in FIG. 4D. More specifically, FIG. 4D depicts an example embodiment in which depth map storage 460 is connected to depth map access module 401 provide a depth map to depth map access module 401, and in which color image storage 461 is connected to application module 405 to provide a color image to application module 405.

Figure 5A:
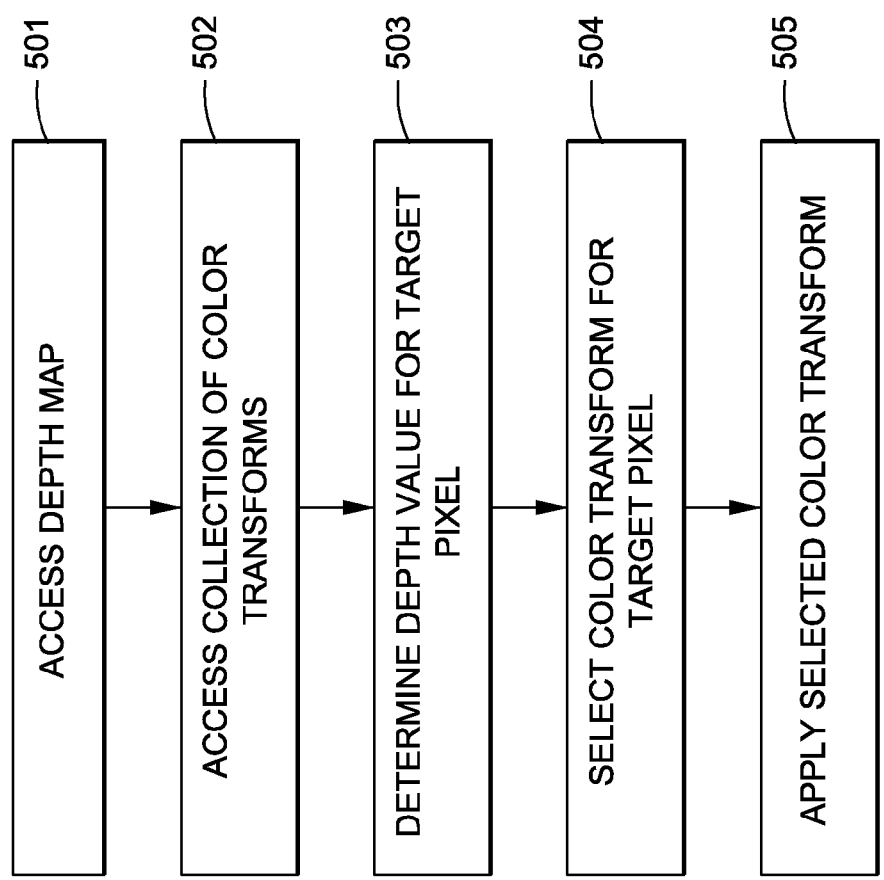
FIGS. 5A and 5B are flowcharts illustrating example processes for transforming colors in a color image by a destination device.

FIG. 5A is a flowchart illustrating an example process for transforming colors in a color image by a destination device.

Briefly, in FIG. 5A, colors in a color image are transformed by a destination device. The color image comprises pixels with color information. A depth map corresponding to the color image is accessed. The depth map comprises depth information for the color image and indicates the relative position of objects in the color image from a reference point of view. A collection of plural different color transforms is accessed. In addition, a depth value for a target pixel in the color image is determined by using the depth map. There is a selection of a color transform for the target pixel from the collection of plural different color transforms, based on the depth value determined for the target pixel. The selected color transform is applied to the color information of the target pixel by the destination device.

In more detail, in step 501, a depth map corresponding to the color image is accessed. The depth map comprises depth information for the color image and indicates relative position of objects in the color image from a reference point of view.

In one example embodiment, the reference point may be the viewpoint of a physical camera (or virtual camera, in the case that the scene, or part of it, is computer-generated or otherwise not captured by a physical camera). Thus, the corresponding depth map may indicate the relative position of the objects of pixels in the image from the camera viewpoint. In other words, in the depth map, pixels depicting objects closer to the camera would have smaller depth values, whereas pixels depicting objects farther from the camera would have larger depth values.

A depth map is typically a grayscale image. Generally, a depth camera or sensor can be used to capture a depth map. There are known techniques to capture a depth map. such as multi-view stereo, photometric stereo, structured light, depth from focus/defocus, and time of flight method, among others.

In one embodiment, a depth map access module is connected to the depth camera or sensor. The depth map can be captured dynamically at the same time as the color image is captured and/or processed (or transformed). The depth camera can measure depth based on a number of established principles. These principles can include, but not limited to, triangulation by stereoscopic 3D capture, 3D scanning by structured light, photometric stereo, time-of-flight camera or LIDAR system.

The color image being processed and the depth map may be arranged in corresponding grids. For example, pixels of the color image may be arranged in a first grid, and the depth information of the depth map may arranged in a second grid whose resolution and/or bit depth can be lower than that of the first grid.

For example, an RGB image may have dimension W×H, such as 1920×1080, with bit depth N, such as N=12, in each color channel. The resolution and bit depth of the associated depth map may be much lower, e.g., resolution of 640×360, and bit depth n=5, i.e., only 32 levels of depth. Since the resolution and bit depth of the depth map can ordinarily be less than that of the color image, it is ordinarily possible to reduce the effect of the additional resource requirements (such as storage) due to inclusion of depth maps.

Figure 6A:
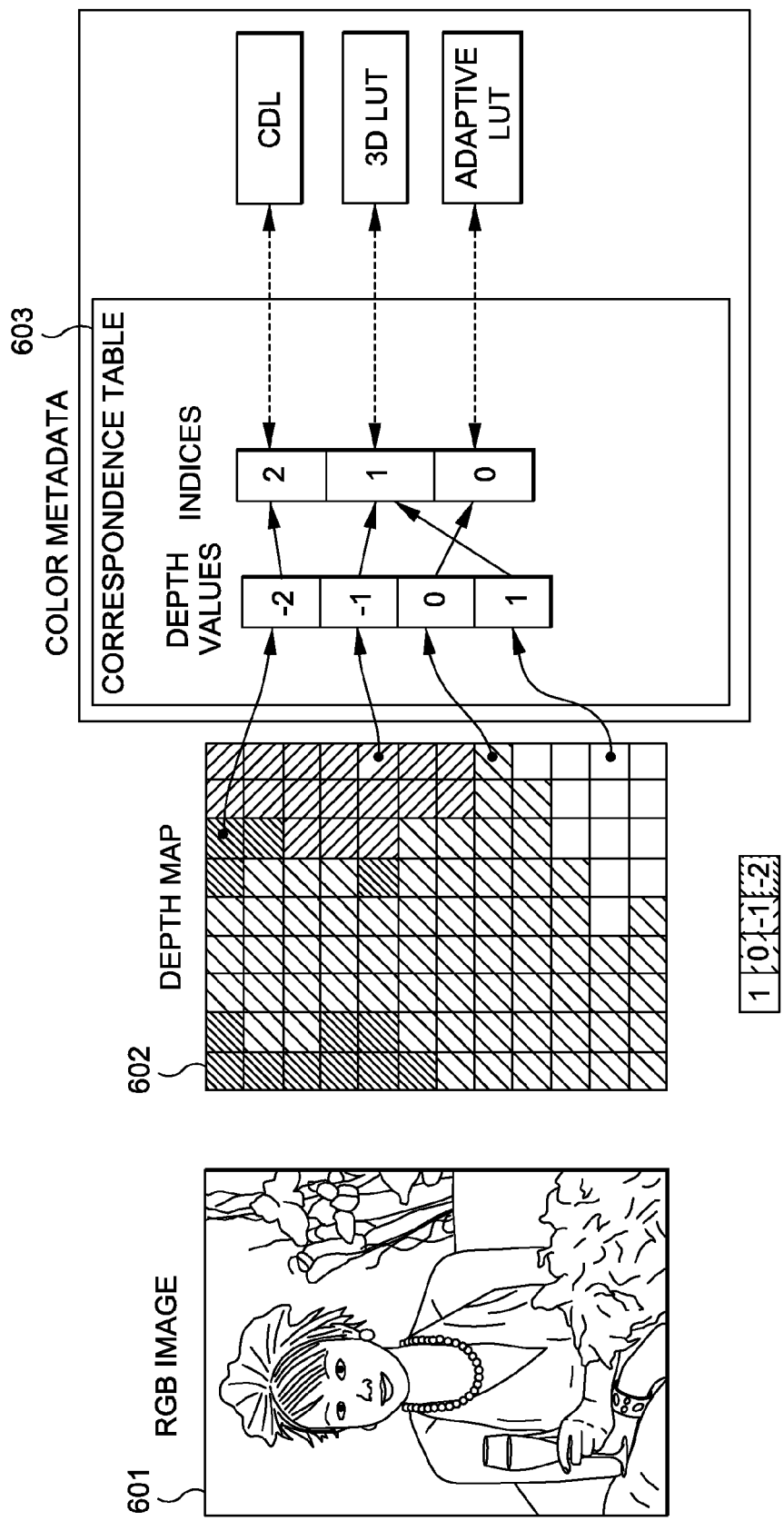

The encoding of depth values in the depth map may be in signed integers, so that the range for n-bit depth resolution is $-2^{n-1}, -2^{n-1}+1, \ldots, -1, 0, 1, \ldots, 2^{n-1}-1$, where depth 0 may be arranged to correspond to the plane of critical focus. The plane of critical focus which corresponds to the part of the image in optical focus. An illustrative example of a color image and depth map is depicted in FIG. 6A, and will be described in more detail below.

In step 502, a collection of plural different color transforms is accessed. In that regard, the accessed collection of transforms can be included in color metadata transmitted to the destination device along with the color image data. Examples of color transforms include ASC CDL (ASC=American Society of Cinematographers, CDL=Color Decision List) and 1D or 3D color LUT (Look Up Table).

The color transforms in the accessed collection may vary in computational complexity. In particular, ASC CDL models very simple primary color correction (tone curve) and can be executed relatively efficiently even on devices with limited computing power such as netbooks, nettops or mobile phones. In such cases, the relatively simple ASC CDL may be packaged as color metadata for the destination device. For another destination device with a reasonably capable GPU that can perform hardware texture interpolation, a 3D LUT may be packaged as color metadata. There are even more computationally intensive color transforms that can preserve color accuracy better, at the expense of more computing operations. For instance, ASC CDL is simply too primitive to model gamut mapping with much accuracy, whereas 3D LUT is generally accurate but tends to lose details near the gamut boundary. An adaptive LUT with variable grid points depending on the distance from the gamut boundary may preserve details of the image better but runs more slowly, particularly on devices with relatively low computational capabilities. Nevertheless, adaptive LUTs may be packaged as color metadata for high end destination devices such as a home theater PC (HTPC) or special purpose set-top boxes. Thus, the set of transforms in the collection may vary according to the capabilities of the destination device.

In step 503, there is a determination of a depth value for a target pixel in the color image, using the depth map.

As indicated above, pixels of the color image may be arranged in a first grid, and the depth information of the depth map may arranged in a second grid whose resolution and/or bit depth can be lower than that of the first grid.

In that regard, since the resolution and bit depth of the depth map can ordinarily be less than that of the image itself, it may be possible that for a target pixel in the color image, there is not a corresponding pixel in the depth map. For example, as can be seen in the illustrative example of FIG. 6A, the spatial resolution of the depth map is much lower than that of the image, and thus not every pixel in the color image will have a unique corresponding pixel in the depth map.

Accordingly, it may be necessary to determine a depth value for a target pixel in the first grid of the color image by interpolating depth information in the second grid of the depth map, using positions of surrounding pixels. In particular, a depth value for a target pixel in the first grid of the color image can be determined by nearest neighbor interpolation, i.e., by simply taking the depth value from a nearest neighbor of the target pixel in the second grid of the depth map. Of course, other interpolation methods are possible.

In step 504, there is a selection of a color transform for the target pixel, from the collection of plural different color transforms. The color transform is selected based on the depth value determined for the target pixel.

The complexity of the selected color transform may depend on the perceptual sharpness of the region where the target pixel belongs, such as a region within a depth of field. For example, the selected color transform may be relatively accurate but computationally intensive for depth values inside a depth of field, while the selected color transform may be relatively crude but computationally efficient for depth values outside the depth of field. In an example embodiment, a depth of field can be determined from camera settings during capture that are stored as metadata (e.g., in EXIF), and the depth value for the target pixel is compared to the determined depth of field.

In one example, the process of selecting a color transform may include accessing a correspondence table which is constructed to store a mapping between depth information and the plural different color transforms in the collection. In particular, selection of a color transform may include determining an index into the correspondence table by using the depth value determined for the target pixel, and selecting a color transform corresponding to the index in the correspondence table.

Moreover, the mapping of depth values to transforms may be based on computational capability of the destination device. For example, the mapping may be arranged such that depth values inside a depth of field are mapped to color transforms that are relatively accurate but computationally intensive, while depth values outside the depth of field are mapped to color transforms that are relatively crude but computationally efficient.

Thus, the color metadata includes multiple color transforms with varying computational complexity, the choice of which is determined by the depth information of the pixel.

In step 505, the selected color transform is applied to the color information of the target pixel.

In one embodiment, the steps of determining a depth value, selecting a color transform, and applying the selected color transform are repeated for each pixel of the color image. These steps may be performed in series, or alternatively in parallel for each pixel of the color image (for example using GPU 118). Whether the transforms can be performed in parallel or in series may depend on the particular transforms being applied.

Figure 5B:
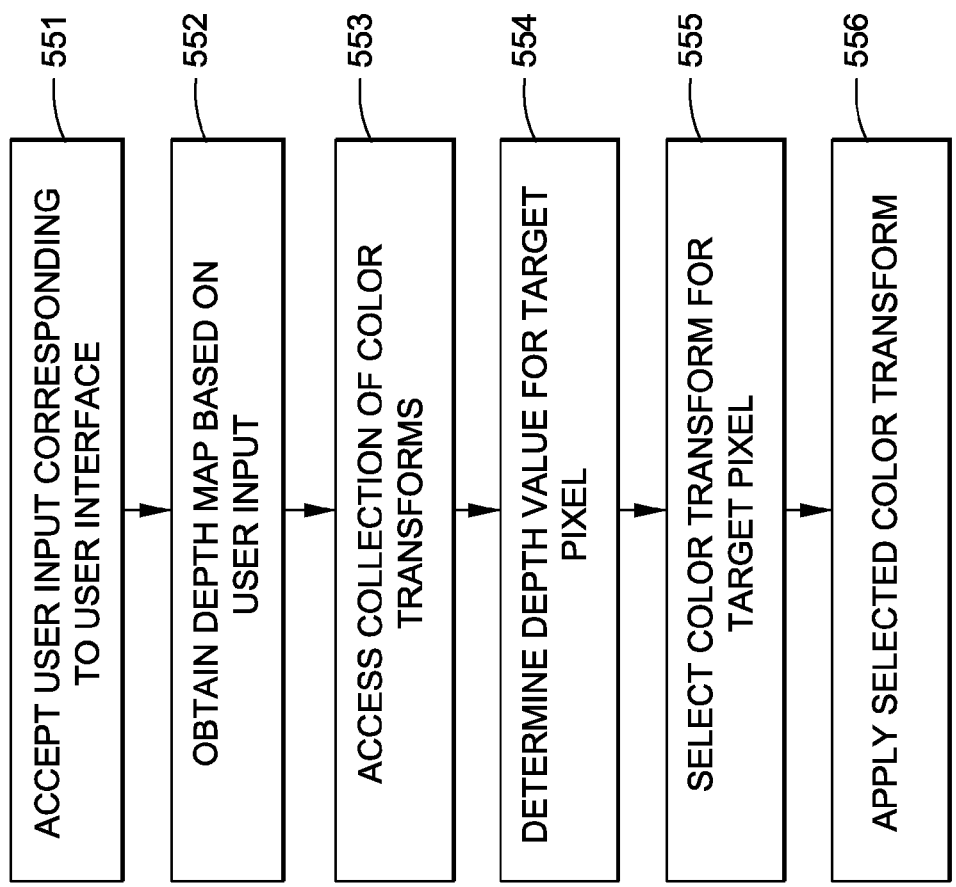

FIG. 5B is a flowchart illustrating another example process for transforming colors in a color image by a destination device.

In particular, in the embodiment of FIG. 5B, a depth map access module is connected to a user interface system, where a user can manipulate either manually or semi-automatically to generate a depth map dynamically.

Briefly, in FIG. 5B, a user interface is displayed. User input is accepted corresponding to the displayed user interface. A depth map is obtained based on the accepted user input. The depth map comprises depth information for the color image and indicates the relative position of objects in the color image from a reference point of view. A collection of plural different color transforms is accessed. In addition, a depth value for a target pixel in the color image is determined by using the depth map. There is a selection of a color transform for the target pixel from the collection of plural different color transforms, based on the depth value determined for the target pixel. The selected color transform is applied to the color information of the target pixel by the destination device.

In step 551, user input is accepted corresponding to a displayed user interface. Using the user interface, a user may generate a desired depth map. In particular, in one instance, the user may manually designate regions of the color image and assign a depth value to each region. Such depth values may come from focusing information of a camera or other external measurements.

Thus, user input is accepted to manually designate regions of the color image and assign depth values. The regions may be specified by the user by touch inputs or other inputs. For example, a user may define one or more regions of interest. As discussed above, the user inputs may include for example, touch inputs 453, numeric inputs 454, pen inputs 455 or voice inputs 456. Of course, other types of inputs are possible.

In one example, a procedure may run initially to determine an initial estimate of the depth map based on depth cues or focusing information. The user can then fine tune the depth map manually as above. The depth cues that the procedure exploits can be based on any number of monocular depth cues, including, but not limited to, perspective, shading, relative sizes, occlusion, texture gradient or blur. The focusing information can come from a focusing system or autofocusing system of a camera.

In step 552, a depth map is obtained based on the user input. The depth map comprises depth information for the color image and indicates relative positions of objects in the color image from a reference point of view. Specifically, depth values for regions or areas of the color image are obtained based on the user input accepted in step 551.

Steps 553 to 556 are similar to steps 502 to 505 described above, but for convenience are described here in further detail.

In step 553, a collection of plural different color transforms is accessed. In that regard, the accessed collection of transforms can be included in color metadata transmitted to the destination device along with the color image data. Examples of color transforms include ASC CDL (ASC=American Society of Cinematographers, CDL=Color Decision List) and 1D or 3D color LUT (Look Up Table).

The color transforms in the accessed collection may vary in computational complexity. In particular, ASC CDL models very simple primary color correction (tone curve) and can be executed relatively efficiently even on devices with limited computing power such as netbooks, nettops or mobile phones. In such cases, the relatively simple ASC CDL may be packaged as color metadata for the destination device. For another destination device with a reasonably capable GPU that can perform hardware texture interpolation, a 3D LUT may be packaged as color metadata. There are even more computationally intensive color transforms that can preserve color accuracy better, at the expense of more computing operations. For instance, ASC CDL is simply too primitive to model gamut mapping with much accuracy, whereas 3D LUT is generally accurate but tends to lose details near the gamut boundary. An adaptive LUT with variable grid points depending on the distance from the gamut boundary may preserve details of the image better but runs more slowly, particularly on devices with relatively low computational capabilities. Nevertheless, adaptive LUTs may be packaged as color metadata for high end destination devices such as a home theater PC (HTPC) or special purpose set-top boxes. Thus, the set of transforms in the collection may vary according to the capabilities of the destination device.

In step 554, there is a determination of a depth value for a target pixel in the color image, using the depth map.

Pixels of the color image may be arranged in a first grid, and the depth information of the depth map may arranged in a second grid whose resolution and/or bit depth can be lower than that of the first grid.

In that regard, since the resolution and bit depth of the depth map can ordinarily be less than that of the image itself, it may be possible that for a target pixel in the color image, there is not a corresponding pixel in the depth map. For example, as can be seen in the illustrative example of FIG. 6A, the spatial resolution of the depth map is much lower than that of the image, and thus not every pixel in the color image will have a unique corresponding pixel in the depth map.

Accordingly, it may be necessary to determine a depth value for a target pixel in the first grid of the color image by interpolating depth information in the second grid of the depth map, using positions of surrounding pixels. In particular, a depth value for a target pixel in the first grid of the color image can be determined by nearest neighbor interpolation, i.e., by simply taking the depth value from a nearest neighbor of the target pixel in the second grid of the depth map. Of course, other interpolation methods are possible.

In step 555, there is a selection of a color transform for the target pixel, from the collection of plural different color transforms. The color transform is selected based on the depth value determined for the target pixel.

The complexity of the selected color transform may depend on the perceptual sharpness of the region where the target pixel belongs, such as a region within a depth of field. For example, the selected color transform may be relatively accurate but computationally intensive for depth values inside a depth of field, while the selected color transform may be relatively crude but computationally efficient for depth values outside the depth of field. In an example embodiment, a depth of field can be determined from camera settings during capture that are stored as metadata (e.g., in EXIF), and the depth value for the target pixel is compared to the determined depth of field.

In one example, the process of selecting a color transform may include accessing a correspondence table which is constructed to store a mapping between depth information and the plural different color transforms in the collection. In particular, selection of a color transform may include determining an index into the correspondence table by using the depth value determined for the target pixel, and selecting a color transform corresponding to the index in the correspondence table.

Moreover, the mapping of depth values to transforms may be based on computational capability of the destination device. For example, the mapping may be arranged such that depth values inside a depth of field are mapped to color transforms that are relatively accurate but computationally intensive, while depth values outside the depth of field are mapped to color transforms that are relatively crude but computationally efficient.

Thus, the color metadata includes multiple color transforms with varying computational complexity, the choice of which is determined by the depth information of the pixel.

In step 556, the selected color transform is applied to the color information of the target pixel.

In one embodiment, the steps of determining a depth value, selecting a color transform, and applying the selected color transform are repeated for each pixel of the color image. These steps may be performed in series, or alternatively in parallel for each pixel of the color image (for example using GPU 118). Whether the transforms can be performed in parallel or in series may depend on the particular transforms being applied.

FIG. 6A is a view for explaining selection of color transforms for pixels according to an example embodiment.

As described above, there is a determination of the depth value corresponding to a particular pixel.

As can be seen from FIG. 6A, the resolution and bit depth of depth map 602 is relatively low compared to the original RGB image 601. In particular, for illustrative purpose, depth map 602 is shown to have much less pixels than the number of pixels in the RGB image, and depth map 602 is shown to have only a bit depth of 2, i.e., four possible depth values (−2, −1, 0, and 1), whereas the RGB image may have a total color depth of 24, i.e., over 16 million of possible values for a pixel.

Due to the reduced resolution of the depth map, it may be necessary to interpolate the depth value for a pixel from nearby depth values. In FIG. 6A, a nearest neighbor interpolation is used.

Once the depth value for the pixel is determined, there is a determination of which transform corresponds to the depth value. As shown in FIG. 6A, color metadata 603 stores a mapping (e.g., a correspondence table) between depth values and different transforms. Color metadata 603 includes CDL (least computationally expensive, but least accurate), 3D LUT (more computationally intensive, but still relatively efficient and mostly accurate), and adaptive LUT (most accurate but also most computationally intensive).

In this illustrative example, four depth values map to three color transforms: depth value 0 maps to adaptive LUT, depth values −1 and 1 map to 3D LUT, and depth value −2 maps to CDL. In more detail, depth value −2, which is farthest from the plane of critical focus, maps to CDL. On the other hand, depth value 0, which corresponds to the plane of critical focus, maps to adaptive LUT.

Again, the particular mappings of depth values may depend on artistic choice. For example, transforms of different rendering intents other than colorimetric intent, such as non-photorealistic intents, may be used on regions with different depth values, and the assignment of the transforms to depth values is dictated by an artistic choice rather than accuracy consideration.

Of course, the number of color transforms included in the metadata may also depend on a given destination device. For example, for a device with minimum computational capacity, only the simplest color transform may be supported, and all the depth values would be mapped to one transform.

FIG. 6B is a view for explaining an example of a user interface which uses a touch input to specify a region and depth value.

In particular, FIG. 6B shows an example of a user specifying a region and a depth value by touching a region of a color image. As shown in FIG. 6B, a user has selected a region of same depth 653 (indicated by the dashed line) by touching or sliding a finger across the corresponding region of image 651. In this example, the user's touch is represented by icon 652. The user can then select a depth value using, for example, slider 654, and the depth value selected for the region can be displayed as depth value 655. Naturally, it should be understood that FIG. 6B is only one example of a user interface for specifying a region and a depth value, and that many other variations are possible.

Figure 7:
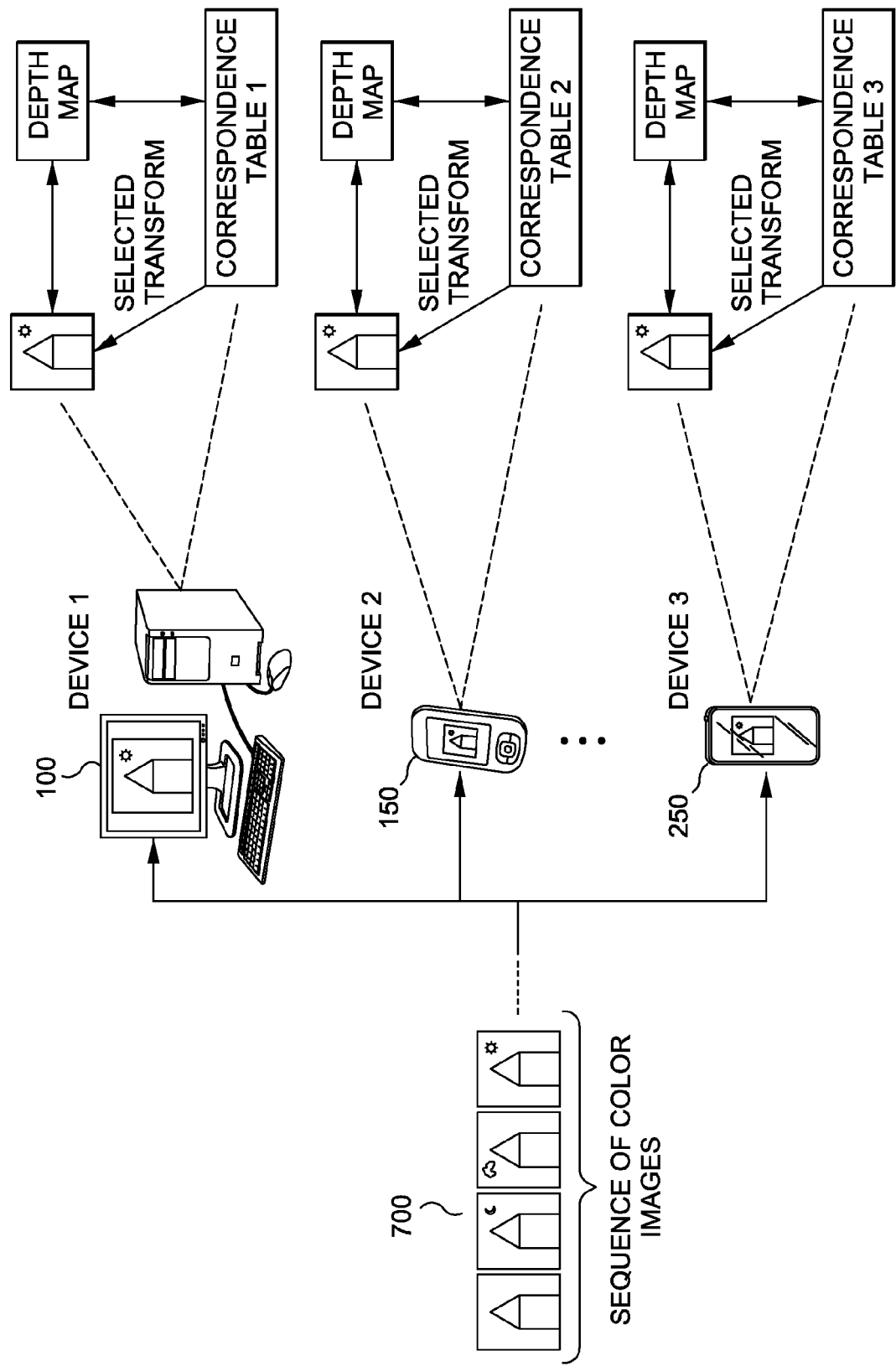
FIG. 7 is a view for explaining distribution of a sequence of plural color images for rendering by multiple different destination devices according to an example embodiment.

FIG. 7 is a view for explaining distribution of a sequence of plural color images for rendering by multiple different destination devices according to an example embodiment.

In the example shown, the multiple different destination devices include computer 100, PDA 150, and cell phone 250, although more or other devices are possible.

In FIG. 7, each color image comprises pixels with color information. There is a predesignated collection of plural different color transforms for each destination device, and there is an association of each color image with a depth map. The depth map comprises depth information for the color image and indicates the relative position of objects in the color image from a reference point of view. Each destination device is associated with a correspondence table constructed to store a mapping between the depth information and plural different color transforms in the collection. At the destination device, a color transform is selected for each target pixel in each color image by determining a depth value for the target pixel using the depth map, determining an index into the correspondence table associated with the destination device using the depth value so determined, selecting a color transform corresponding to the index determined, and applying the selected color transform to the target pixel.

As described in more detail above, in one example embodiment, the mapping between depth information and the plural different color transforms for each destination device is arranged such that depth values inside a depth of field are mapped to color transforms that are relatively accurate but computationally intensive, while depth values outside a depth of field are mapped to color transforms that are relatively crude but computationally efficient, and the pixels of the color image are arranged in a first grid and the depth information of the depth map is arranged in a second grid whose resolution can be lower than that of the first grid.

Still, since the resolution and bit depth of the depth map can ordinarily be less than that of the image itself, it may be possible that for a target pixel in the color image, there is not a corresponding pixel in the depth map. Accordingly, it may be necessary to determine a depth value for a target pixel in the first grid of the color image by interpolating using depth information in the second grid of the depth map. In particular, a depth value for a target pixel in the first grid of the color image can be determined by nearest neighbor interpolation, i.e., by simply taking the depth value from a nearest neighbor of the target pixel in the second grid of the depth map. Of course, other interpolation methods are possible.

By including several color transforms in the color metadata with different levels of accuracy and computational complexity and using the depth value of the current pixel to determine which transform to use, the image quality can be optimized to the best possible within the limit of the platform, where the most critical areas of the image are color corrected with the most accurate transform.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for transforming colors in a color image by a destination device, wherein the color image comprises pixels with color information, the method comprising:
   accessing a depth map corresponding to the color image, wherein the depth map comprises depth information for the color image and indicates relative position of objects in the color image from a reference point of view;
   accessing a collection of plural different color transforms;
   accessing a correspondence table which is constructed to store a mapping between depth information and the plural different color transforms in the collection;
   selecting a color transform for a target pixel from the collection of plural different color transforms, wherein the color transform is selected based on a depth value determined for the target pixel, and wherein the selecting comprises determining an index into the correspondence table by using the depth value determined, and selecting a color transform corresponding to the index in the correspondence table; and
   applying the selected color transform to the color information of the target pixel,
   wherein the accessed collection of color transforms is based on computational capability of the destination device, and
   wherein in the selecting step, the selected color transform is relatively accurate but computationally intensive for depth values inside a depth of field, while the selected color transform is relatively crude but computationally efficient for depth values outside the depth of field.

2. The method according to claim 1, further comprising repeated application of the steps of selecting a color transform and applying the selected color transform, for each pixel of the color image.

3. The method according to claim 1, wherein the mapping is based on computational capability of the destination device.

4. The method according to claim 1, wherein the mapping is arranged such that depth values inside a depth of field are mapped to color transforms that are relatively accurate but computationally intensive, while depth values outside the depth of field are mapped to color transforms that are relatively crude but computationally efficient.

5. The method according to claim 1, wherein the pixels of the color image are arranged in a first grid and the depth information of the depth map is arranged in a second grid whose resolution is lower than that of the first grid.

6. The method according to claim 5, wherein the step of determining a depth value for a target pixel in the first grid of the color image comprises the step of interpolating using depth information in the second grid of the depth map.

7. The method according to claim 5, wherein the step of determining a depth value for a target pixel in the first grid of the color image comprises the step of identifying a nearest neighbor of the target pixel in the second grid of the depth map.

8. The method according to claim 1, wherein the accessed depth map is based on user input corresponding to a user interface.

9. An image processing apparatus for transforming colors in a color image by a destination device, wherein the color image comprises pixels with color information, comprising:
   a computer-readable memory constructed to store computer-executable process steps; and
   a processor constructed to execute the computer-executable process steps stored in the memory;
   wherein the process steps stored in the memory cause the processor to:
   access a depth map corresponding to the color image, wherein the depth map comprises depth information for the color image and indicates the relative position of objects in the color image from a reference point of view;
   access a collection of plural different color transforms;
   access a correspondence table which is constructed to store a mapping between depth information and the plural different color transforms in the collection;
   select a color transform for a target pixel from the collection of plural different color transforms, wherein the color transform is selected based on a depth value determined for the target pixel, and wherein the selecting comprises determining an index into the correspondence table by using the depth value determined, and selecting a color transform corresponding to the index in the correspondence table; and
   apply the selected color transform to the color information of the target pixel,
   wherein the accessed collection of color transforms is based on computational capability of the destination device, and
   wherein in the selecting step, the selected color transform is relatively accurate but computationally intensive for depth values inside a depth of field, while the selected color transform is relatively crude but computationally efficient for depth values outside the depth of field.

10. The apparatus according to claim 9, further comprising repeated application of the steps of selecting a color transform and applying the selected color transform, for each pixel of the color image.

11. The apparatus according to claim 9, wherein the mapping is based on computational capability of the destination device.

12. The apparatus according to claim 9, wherein the mapping is arranged such that depth values inside a depth of field are mapped to color transforms that are relatively accurate but computationally intensive, while depth values outside the depth of field are mapped to color transforms that are relatively crude but computationally efficient.

13. The apparatus according to claim 9, wherein the pixels of the color image are arranged in a first grid and the depth information of the depth map is arranged in a second grid whose resolution is lower than that of the first grid.

14. The apparatus according to claim 13, wherein the step of determining a depth value for a target pixel in the first grid of the color image comprises the step of interpolating using depth information in the second grid of the depth map.

15. The apparatus according to claim 13, wherein the step of determining a depth value for a target pixel in the first grid of the color image comprises the step of identifying a nearest neighbor of the target pixel in the second grid of the depth map.

16. The apparatus according to claim 9, wherein the accessed depth map is based on user input corresponding to a user interface.

17. An image processing module for transforming colors in a color image by a destination device, wherein the color image comprises pixels with color information, comprising:
a depth map access module for accessing a depth map corresponding to the color image, wherein the depth map comprises depth information for the color image and indicates the relative position of objects in the color image from a reference point of view;
a color transform access module for accessing a collection of plural different color transforms, wherein a correspondence table which is constructed to store a mapping between depth information and the plural different color transforms in the collection is also accessed;
a selection module for selecting a color transform for a target pixel from the collection of plural different color transforms, wherein the color transform is selected based on a depth value determined for the target pixel, and wherein the selecting comprises determining an index into the correspondence table by using the depth value determined, and selecting a color transform corresponding to the index in the correspondence table; and
an application module for applying the selected color transform to the color information of the target pixel,
wherein the accessed collection of color transforms is based on computational capability of the destination device, and
wherein in the selecting, the selected color transform is relatively accurate but computationally intensive for depth values inside a depth of field, while the selected color transform is relatively crude but computationally efficient for depth values outside the depth of field.

18. The module according to claim 17, wherein the steps of selecting a color transform and applying the selected color transform are repeated for each pixel of the color image.

19. The module according to claim 17, wherein the mapping is based on computational capability of the destination device.

20. The module according to claim 17, wherein the mapping is arranged such that depth values inside a depth of field are mapped to color transforms that are relatively accurate but computationally intensive, while depth values outside the depth of field are mapped to color transforms that are relatively crude but computationally efficient.

21. The module according to claim 17, wherein the pixels of the color image are arranged in a first grid and the depth information of the depth map is arranged in a second grid whose resolution is lower than that of the first grid.

22. The module according to claim 21, wherein determining a depth value for a target pixel in the first grid of the color image comprises interpolating using depth information in the second grid of the depth map.

23. The module according to claim 21, wherein determining a depth value for a target pixel in the first grid of the color image comprises identifying a nearest neighbor of the target pixel in the second grid of the depth map.

24. The module according to claim 17, wherein the accessed depth map is based on user input corresponding to a user interface.

25. A non-transitory computer-readable storage medium storing computer-executable process steps for causing a computer to perform a method for transforming colors in a color image by a destination device, wherein the color image comprises pixels with color information, the method comprising:
accessing a depth map corresponding to the color image, wherein the depth map comprises depth information for the color image and indicates the relative position of objects in the color image from a reference point of view;
accessing a collection of plural different color transforms;
accessing a correspondence table which is constructed to store a mapping between depth information and the plural different color transforms in the collection;
selecting a color transform for a target pixel from the collection of plural different color transforms, wherein the color transform is selected based on a depth value determined for the target pixel, and wherein the selecting comprises determining an index into the correspondence table by using the depth value determined, and selecting a color transform corresponding to the index in the correspondence table; and
applying the selected color transform to the color information of the target pixel
wherein the accessed collection of color transforms is based on computational capability of the destination device, and
wherein in the selecting step, the selected color transform is relatively accurate but computationally intensive for depth values inside a depth of field, while the selected color transform is relatively crude but computationally efficient for depth values outside the depth of field.

26. The computer-readable storage medium according to claim 25, further comprising repeated application of the steps of selecting a color transform and applying the selected color transform, for each pixel of the color image.

27. The computer-readable storage medium according to claim 25, wherein the mapping is based on computational capability of the destination device.

28. The computer-readable storage medium according to claim 25, wherein the mapping is arranged such that depth values inside a depth of field are mapped to color transforms that are relatively accurate but computationally intensive, while depth values outside the depth of field are mapped to color transforms that are relatively crude but computationally efficient.

29. The computer-readable storage medium according to claim 25, wherein the pixels of the color image are arranged in a first grid and the depth information of the depth map is arranged in a second grid whose resolution is lower than that of the first grid.

30. The computer-readable storage medium according to claim 29, wherein the step of determining a depth value for a target pixel in the first grid of the color image comprises the step of interpolating using depth information in the second grid of the depth map.

31. The computer-readable storage medium according to claim 29, wherein the step of determining a depth value for a target pixel in the first grid of the color image comprises the step of identifying a nearest neighbor of the target pixel in the second grid of the depth map.

32. The computer-readable storage medium according to claim 25, wherein the accessed depth map is based on user input corresponding to a user interface.

33. A content distribution system for distributing a sequence of plural color images for rendering by multiple different destination devices, wherein each color image comprises pixels with color information, the system comprising:
    at least one processor;
    a predesignated collection of plural different color transforms, the collection being accessed;
    an association of each color image with a depth map, wherein the depth map comprises depth information for the color image and indicates the relative position of objects in the color image from a reference point of view; and
    an association of each destination device with a correspondence table constructed to store a mapping between depth information and the plural different color transforms in the collection;
    wherein at the destination device, a color transform is selected for a target pixel in each color image by determining an index into the correspondence table associated with the destination device using a depth value, and selecting a color transform corresponding to the determined index, and the selected color transform is applied to the target pixel;
    wherein the accessed collection of color transforms is based on computational capability of the destination device, and
    wherein the selected color transform is relatively accurate but computationally intensive for depth values inside a depth of field, while the selected color transform is relatively crude but computationally efficient for depth values outside the depth of field.

34. The system according to claim 33, wherein the mapping between depth information and the plural different color transforms for each destination device is arranged such that depth values inside a depth of field are mapped to color transforms that are relatively accurate but computationally intensive, while depth values outside a depth of field are mapped to color transforms that are relatively crude but computationally efficient.

35. The system according to claim 33, wherein the pixels of the color image are arranged in a first grid and the depth information of the depth map is arranged in a second grid whose resolution is lower than that of the first grid.

36. The system according to claim 35, wherein the step of determining a depth value for a target pixel in the first grid of the color image comprises the step of interpolating using depth information in the second grid of the depth map.

37. The system according to claim 35, wherein the step of determining a depth value for a target pixel in the first grid of the color image comprises the step of identifying a nearest neighbor of the target pixel in the second grid of the depth map.

38. The system according to claim 33, wherein a depth map associated with a color image of the plural color images is based on user input corresponding to a user interface.

* * * * *